United States Patent [19]
McDonald et al.

[11] Patent Number: 5,956,647
[45] Date of Patent: *Sep. 21, 1999

[54] METHOD FOR REDUCING USE OF INTERZONE AUDIO RESOURCES IN A MULTIZONE COMMUNICATION SYSTEM

[75] Inventors: Daniel J. McDonald, Cary; George R. Economy, Arlington Heights, both of Ill.

[73] Assignee: Motorola, Inc., Schaumburg, Ill.

[*] Notice: This patent issued on a continued prosecution application filed under 37 CFR 1.53(d), and is subject to the twenty year patent term provisions of 35 U.S.C. 154(a)(2).

[21] Appl. No.: 08/549,901

[22] Filed: Oct. 30, 1995

[51] Int. Cl.⁶ .................................................. H04B 7/15
[52] U.S. Cl. ........................................ 455/518; 455/520
[58] Field of Search ........................ 455/54.2, 56.1, 455/33.1, 34.1, 53.1, 62, 63, 517, 518, 519, 520, 524

[56] References Cited

U.S. PATENT DOCUMENTS

| | | |
|---|---|---|
| 5,058,199 | 10/1991 | Grube ........................................ 455/56.1 |
| 5,095,529 | 3/1992 | Comroe et al. ........................... 455/56.1 |
| 5,293,638 | 3/1994 | Sasuta et al. .............................. 455/520 |
| 5,313,652 | 5/1994 | Rozenstrauch et al. ................. 455/56.1 |
| 5,319,796 | 6/1994 | Grube et al. ............................... 455/518 |
| 5,327,573 | 7/1994 | Lenchik et al. ........................... 455/520 |
| 5,483,575 | 1/1996 | Zdanowski et al. ....................... 379/58 |
| 5,535,426 | 7/1996 | Leigh et al. ............................... 455/520 |
| 5,594,947 | 1/1997 | Grube et al. ............................... 455/63 |

*Primary Examiner*—Edward F Urban
*Attorney, Agent, or Firm*—James A. Coffing; George C. Pappas

[57] ABSTRACT

A radio communication system includes a plurality of sites that each belong to one of a plurality of zones. The plurality of zones are each linked to a zone controller and the plurality of sites are employed to facilitate communications among a plurality of communication units affiliated therewith. A method of establishing a communication between two of the plurality of communication units that are presently affiliated with sites not belonging to a common zone includes the step of determining a preferred zone for at least one of the plurality of communication units. After identifying a usable site that belongs to the preferred zone, the communication unit then affiliates with the usable site to facilitate the communications with the second communication unit.

20 Claims, 3 Drawing Sheets

— PRIOR ART —

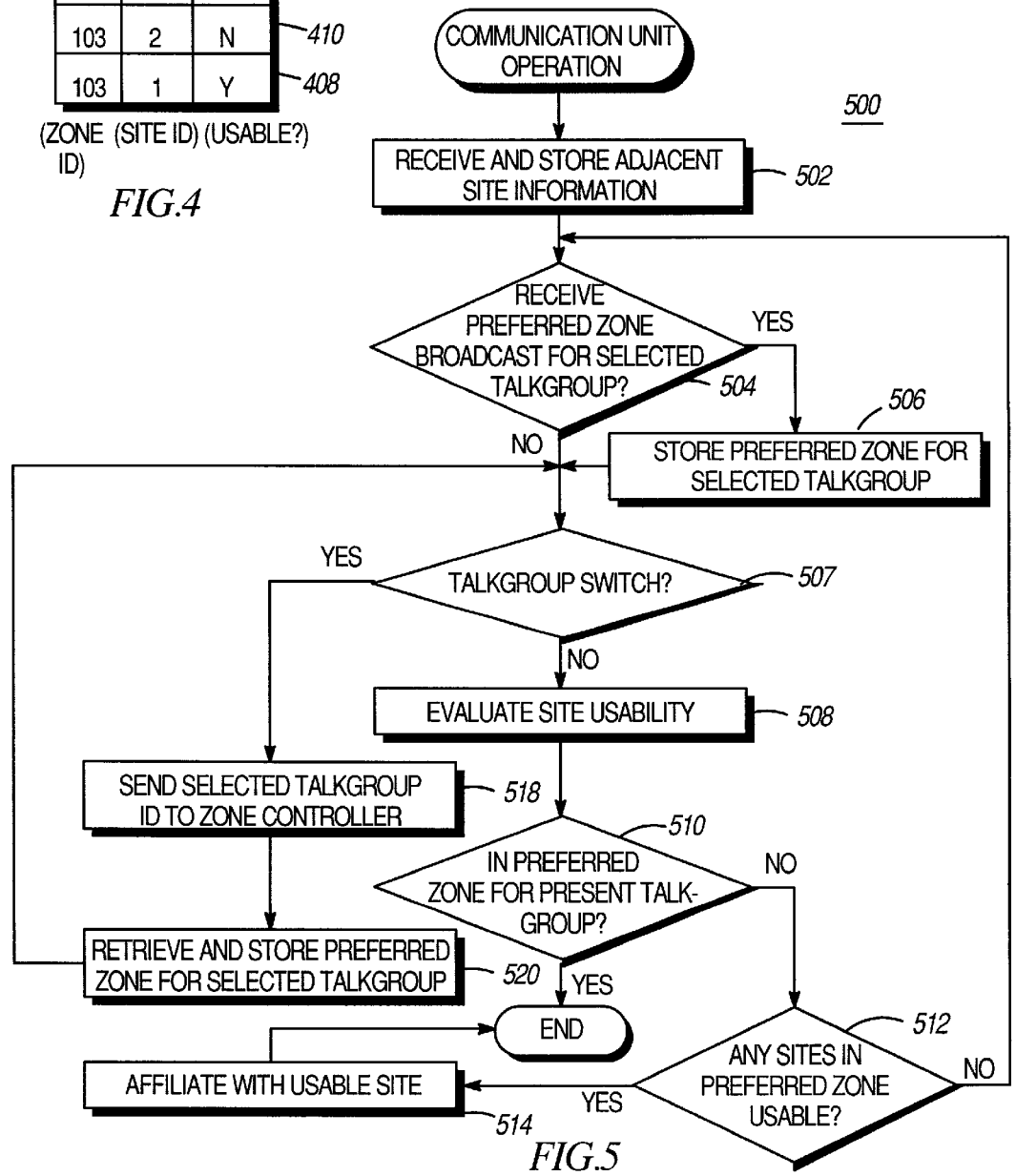

5,956,647

METHOD FOR REDUCING USE OF INTERZONE AUDIO RESOURCES IN A MULTIZONE COMMUNICATION SYSTEM

FIELD OF THE INVENTION

The invention relates generally to radio communication systems, and more particularly to facilitating communications within a multizone communication system.

BACKGROUND OF THE INVENTION

Radio communication systems are known to include a plurality of communication sites that facilitate communications amongst a plurality of communication units. A collection of such communication sites is commonly referred to as a zone, (e.g., SmartZone™ Systems as manufactured by Motorola, Inc.). Generally, zones can be characterized as a plurality of overlapping coverage areas resulting from spatially separated communication sites. Communication units within the overlapping coverage areas route their calls through any one of a plurality of usable communication sites (i.e., those through which control and audio signaling can be readily exchanged). In an effort to expand the coverage areas of communication systems, system installers are beginning to link the zone communication systems together, e.g., the SmartZone OmniLink™ System, as manufactured by Motorola, Inc. Linking communication zones in this manner, however, creates a number of resource allocation problems not present in single zone systems. Principal among these problems is the undesirable use of interzone audio resources, as next described.

By way of example, FIG. 1 shows a multizone communication system 100 that includes zones 102, 103 whose sites are linked to zone controllers 105, 106 respectively. Audio signals are routed between the two zones, 102, 103 via audio switches 107, 108, by way of interzone audio resources 109. These interzone audio resources 109 might be comprised of leased DS1 circuits, analog or digital circuits, or private microwave facilities.

Communication units 111–117, which may be mobile radios, portable radios, dispatch consoles or the like, are distributed about the multizone communication system 100. When establishing communications amongst the many communication units, there are three possible audio paths that might be required. The three audio paths are: 1) intrasite; 2) intersite in the same zone; and 3) intersite across two or more zones. The first path, intrasite, refers to calls between members of a talkgroup that are all located within the coverage area of a single site (e.g., mobiles 111 and 112). The second path, intersite in the same zone, refers to calls between some talkgroup members that are within the coverage area of a first site, and others that are within the coverage area of a second site within the same zone (e.g., mobile 111 and portable 113). The third path, intersite across two zones, refers to calls between members of the talkgroup that are within the coverage area of a first site in a first zone, and other members of the talkgroup that are within the coverage area of a second site within a second zone (e.g., portable radios 116, 117). Of these scenarios, the first two create no special hardships for the subscriber or the system. That is, they don't result in any extraordinary access time delays or undue channel congestion, as no interzone audio resources are required to facilitate such communications.

By contrast, the third scenario requires not only the usurpation of scarce interzone audio resources 109, but additionally, there are at least two access related problems created by utilizing this audio path. In particular, there may be on the order of a 200–300 millisecond delay in the call setup, thereby resulting in audio holes and delayed communications. More critically, the probability of being granted one of these scarce audio resources 109 is dramatically decreased as the system becomes more congested. While the time delay problem is limited by switching or processing speed, the access probability can only be improved by adding more interzone audio resources 109. Unfortunately, communication resources of this type are rather costly, which drives up the system operating costs dramatically. Accordingly, a need exists for reducing the dependency on expensive audio resources between zones, if possible, without impacting the ability of communication units to communicate with each other.

BRIEF DESCRIPTION OF THE DRAWINGS

FIG. 2 shows a talkgroup membership table, in accordance with the present invention.

FIG. 3 shows a preferred zone table, in accordance with the present invention.

FIG. 4 shows a table bearing adjacent site information, in accordance with present invention.

FIG. 5 shows a flow diagram depicting the operation of a communication unit, in accordance with the present invention.

DETAILED DESCRIPTION OF A PREFERRED EMBODIMENT

The present invention encompasses a radio communication system that includes a plurality of communication sites, each belonging to one of a plurality of communication zones. These communication sites are each linked to a zone controller and an audio switch. Communication among a plurality of communication units throughout the communication system is facilitated through the plurality of communication sites. Interzone communications are established using the zone controllers and interzone audio resources linking the audio switches at the respective zones. By associating a preferred zone with at least one of the communication units, the present invention allows two communications units that are presently affiliated with sites not belonging to a common zone to communicate without using interzone audio resources. That is, by identifying a usable site that belongs to the preferred zone, and affiliating with that site, subsequent communications between these units can be conducted using only intrazone resources.

Figure 1:
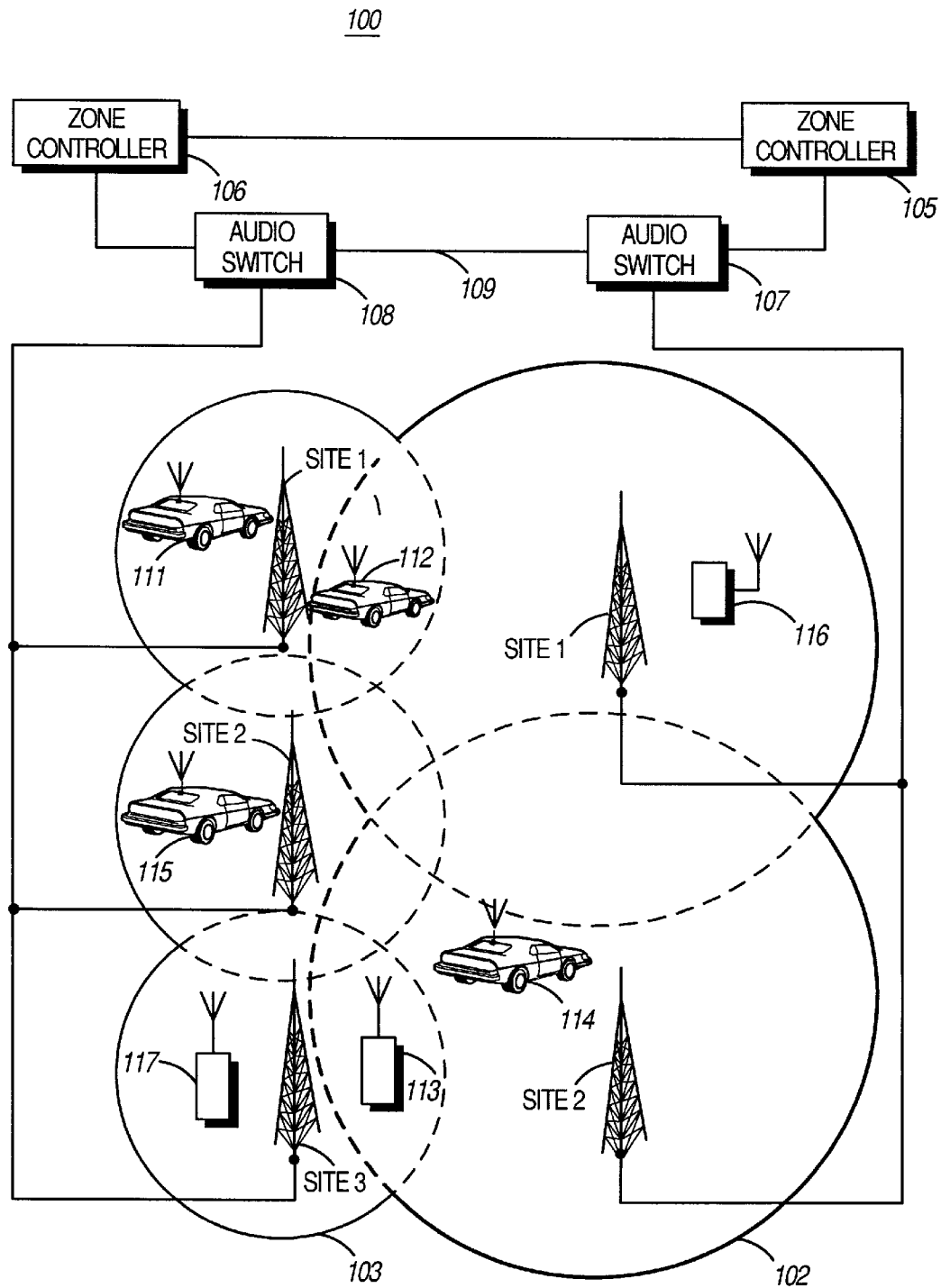
FIG. 1 shows a multizone radio communication system, as is known in the art.

FIG. 2 shows a talkgroup member list 200 as it might appear in one of the zone controllers 105, 106 as shown in FIG. 1. In particular, field 201 stores talkgroup identifiers, while field 203 stores a member list describing those communication units that are presently members of the talkgroup so identified. Here, records 205, 207, 209 show that communication units 111, 113 are members of talkgroup A; communication units 112, 114 are members of talkgroup B; and communication units 116, 117 are members of talkgroup C. It is noted that this talkgroup member list is dynamic in nature and must be updated when talkgroup characteristics for the respective communication units change (e.g., when a radio operator switches talkgroups). It is further noted that there are typically many more communication units associated with a particular talkgroup, and the short member list shown in FIG. 2 is for illustration purposes only.

FIG. 3 shows a preferred zone table 300, in accordance with the present invention. Field 301 stores the plurality of talkgroup ID's, while field 303 stores the identifier of the preferred zone for that talkgroup. As depicted, record 305 indicates that talkgroup has a preferred zone ID of 103, while records 307, 309 indicate that zone 102 is the preferred zone for talkgroups B and C. It should be noted that there are several ways of determining the preferred zone for a talkgroup (later set forth as block 601 in FIG. 6), in accordance with the invention, as next described.

First, the preferred zone table 300 might be preprogrammed into the communication units. Using this alternative, a new preferred zone would be identified, using the preprogrammed table, upon a talkgroup change by the radio operator. This alternative would likely be the least flexible, as the information is static in nature, but would be efficient and simple to implement. Second, the system operator or system manager could associate a preferred zone, via a system management device (e.g., system management terminal), with each of the active talkgroups. The third and preferred embodiment allows the preferred zones to be determined by the zone controller based on various system events. That is, because the mobility patterns of the communication units is dynamic, the determination could be made so that the highest volume of calls could be established without using interzone resources.

In one such arrangement, site affiliation information could be used to determine the zone presently facilitating communications for the greatest number of users (and hence the greatest expected traffic volume). The zone with the greatest number (e.g., based on a predetermined minimum percentage threshold) of talkgroup members is determined to be the preferred zone for that talkgroup. In this manner, the number of interzone audio resources required to facilitate communications between members of the same talkgroup is reduced. It should be noted, however, that this technique assumes the call loading offered by each communication unit to be the same.

Using a second approach, site affiliations could be used to track the most recent and greatest number of communication unit affiliation changes. For example, a large cluster of communication units might be traveling from one zone to another. Using this approach, a statistically significant change (e.g., based on a predetermined threshold) could be used to determine a new preferred zone for the migrating communication units. This approach assumes that there will be an increase in voice traffic attendant with the sudden migration, independent of the total percentage of communication units migrating.

Thirdly, since preferred zone settings are intended to reduce the actual usage of interzone audio resources, the actual loading of those resources can also be used in determining the preferred zone for a talkgroup. In this technique the call load (or time used) for each communication unit is classified. This can be done in a number of ways, such as having the zone controller track the communication units system usage over time or using an apriori classification of each communication unit's call load. By knowing the distribution of communication units, the talkgroups of which these units are members and the call load offered by these units, the zone controller is able to select the preferred zone for the talkgroup.

By way of example, assume a two zone system comprised of zones X and Y, where talkgroup B has communication units affiliated with sites in both zones. Zone X may have 10 units affiliated with sites therein, while zone Y may have 20 communication units affiliated with it's sites. The 10 units in zone X, however, are known to offer triple the call load, as compared with the 20 units in zone Y. Since the interzone call traffic for this talkgroup would be significantly reduced by making zone X the preferred zone, it would be beneficial to gather all 30 communication units in zone X for this purpose. Over a period of time this could serve to minimize the number of users in zone Y, and thereby minimize usage of interzone audio resources.

To illustrate how the preferred zone is used by the communication units to reduce use of interzone audio resources, FIG. 4 shows an adjacent site table 400 as it might appear in communication unit 112 shown in FIG. 1. In this table, field 401 stores a zone identifier; field 403 stores a site identifier; and field 405 stores a binary flag indicating whether or not the identified site is usable by that particular communication unit. Referring to Table 400 and to the configuration shown in FIG. 1, it can be seen that communication unit 112 is within the coverage ranges of "Site 1" for zones 102 and 103. Thus, the adjacent site table 400 indicates, via records 407, 408, that these sites are usable by communication unit 112. Similarly, records 409, 410 show that the two adjacent sites (i.e., site 2, zone 102 and site 2, zone 103) are not usable by this communication unit.

The usable site flag comprises a binary flag (having a value of "Y" for usable and "N" for not usable) that indicates whether a site is usable by the communication unit storing the flag. In a preferred embodiment, the setting of this flag is controlled by the communication unit and is based on the communication unit's ability to exchange control signals, via the control channel, with a site that is adjacent to the site presently having that communication unit's affiliation/registration. According to the invention, the communication unit, when not active in a communication, periodically performs (see FIG. 5, block 508) a site usability check, such as a signal strength measurement. A usability value falling within an acceptable range for each adjacent site will result in the communication unit setting the usable site flag to "Y" for that site. Each adjacent site having a usability value below this range will result in the communication unit setting the usable site flag to "N" for that site. As next shown, the communication unit continually and periodically evaluates the site usability of the adjacent sites to determine the value of the usable site flag.

FIG. 5 shows a flow diagram depicting the operation of a communication unit, in accordance with the present invention. By monitoring the control channel, the communication unit receives and stores (502) adjacent site information. By way of example, communication unit 112 shown in FIG. 1 may be presently affiliated with Site 1 of Zone 102, as shown. Thus, adjacent site information would comprise the site ID's for each of those sites adjacent to this site. That is, the site usability table (such as the one shown in FIG. 4) would include records for the three sites adjacent to the affiliated site (i.e., Site 2 of Zone 102, and Sites 1 and 2 of Zone 103).

After the adjacent site information is received and stored, a decision (504) is reached to determine whether or not the preferred zone broadcast for the selected talkgroup has been received from the zone controller. (It should be noted that this step is preferably skipped by the communication unit that stores its own preferred zone table 300, as earlier described). Upon receipt of the preferred zone broadcast, the communication unit stores (506) the preferred zone ID for the talkgroup. After the preferred zone ID is stored, or if no broadcast is received, a decision (507) is reached to determine whether or not the talkgroup has been switched (e.g., by the communication unit operator selecting a different talkgroup). If no talkgroup switch has taken place, the communication unit evaluates (508) site usability by attempting to monitor the control channels for those sites identified in the adjacent site list. For each of these sites, the communication unit updates the usability table 400 shown in FIG. 4. In the example, this update would reveal (i.e., records 407, 408 show a "Y" entry for field 405) that Site 1 of Zone 102 and Site 1 of Zone 103 are usable for communication by communication unit 112. Thus, because communication unit 112 is outside the coverage area for Site 2 of Zone 102 and Site 2 of Zone 103, the usability entry for those records (i.e., 409, 410 shown in FIG. 4) indicates (i.e., "N" entry) that communication unit 112 cannot use these sites for establishing subsequent communications.

The communication unit then determines (510) whether or not it is currently in the preferred zone for the present talkgroup. In particular, the preferred zone table 300 shown in FIG. 3 is used to resolve this question. It should be noted that the present invention anticipates use of table 300 in one of two ways: 1)the preferred zone table can be stored in the zone controller, which periodically transmits (as described with reference to FIG. 6) preferred zone IDs, via control channels at each site, to talkgroup members during operation; and 2), the preferred zone table 300 may be stored in each communication unit, thereby giving a direct indication to the radio whether or not it is presently affiliated with a site in the preferred zone for that talkgroup.

If it is determined that the communication unit is in the preferred zone, the routine is exited. If not in the preferred zone, the communication unit attempts to determine (512) whether or not any sites in the preferred zone are usable. Here, the communication unit refers to the site usability table 400 shown in FIG. 4 to determine whether or not its present zone affiliation aligns with any site that is presently usable (i.e., whether the usability field 405 is set to "Y"). If not, the communication unit continues to monitor the control channel looking for a preferred zone broadcast (504). Upon detection of a usable site in the preferred zone, the communication unit affiliates (514) with that usable site, using known registration techniques, and the routine is exited.

Referring again to block 507, if it is determined that the communication unit's talkgroup setting has been switched, the communication unit sends (518) the newly selected talkgroup ID to the zone controller using known control channel signaling. The communication unit then waits until it receives (or retrieves in the case of a communication unit having a preferred zone table 300) and stores (520) the preferred zone ID for the selected talkgroup. The communication unit then returns to the step of monitoring for a talkgroup switch (507). In this manner, the communication unit continuously attempts to affiliate with a site within its preferred zone, thereby making subsequent communications with other talkgroup members more likely to use intrazone audio resources. Accordingly, use of interzone audio resources is reduced, thereby providing a distinct advantage over systems of the prior art.

Figure 6:
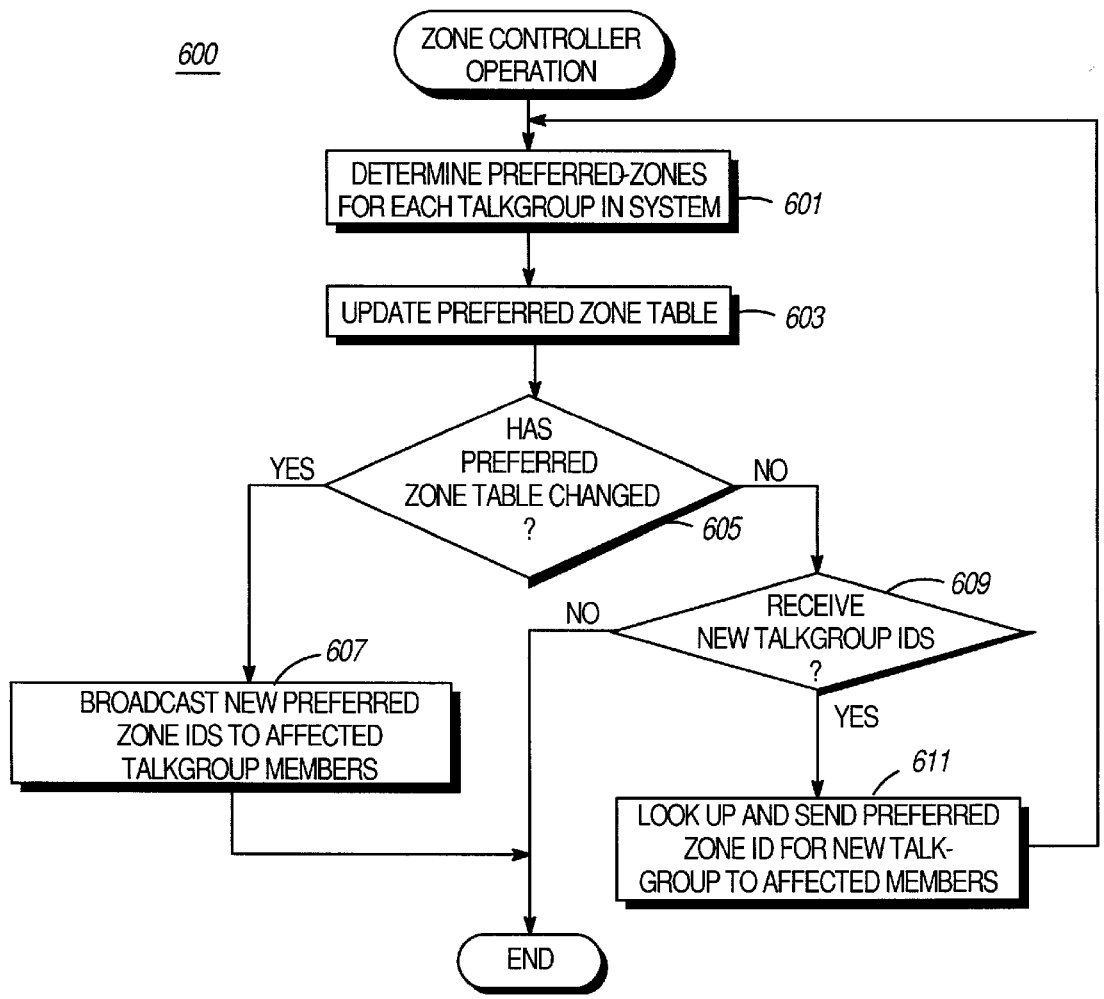
FIG. 6 shows a data flow diagram depicting operation of the zone controller, in accordance with the present invention.

FIG. 6 shows a flow diagram 600 depicting the zone controller operation, in accordance with the present invention. The preferred zone is determined (601) according to one of the methods shown above. For illustration purposes, it is assumed that one of the three dynamic methods is used to determine the preferred zone for each talkgroup. The preferred zone table is then updated (603), preferably automatically by the zone controller. A decision (605) is then reached to determine whether the preferred zone table has changed since the last time it was updated. If a change is detected (e.g., using a simple comparison algorithm) the new preferred zone information is broadcast (607) to those talkgroup members affected by the change.

Conversely, if the preferred zone table has not changed since the last time it was updated the zone controller continues to process talkgroup characteristic changes sent by the communication units (i.e., block 518 in FIG. 5). As communication units change talkgroups and new talkgroup IDs are received (609) by the zone controller, the communication units are sent (611) the preferred zone ID corresponding to the new talkgroup (i.e., after being looked up in the preferred zone table 300). The new talkgroup characteristics are also used by the zone controller in the continuing determination (601) of preferred zones, as earlier described.

What is claimed is:

1. In a trunked radio communication system including a first communication unit presently affiliated to a first usable site linked to a first zone controller, a method of reducing interzone activity by causing said first communication unit to affiliate to an adjacent usable site associated with a preferred zone during call set up of a first talkgroup call involving a plurality of communication units located throughout a coverage area defined by sites linked to said first zone controller and to at least a second zone controller, the method comprising the steps of:

identifying a call setup request for a first talk group call involving said first communication unit;

selecting as a preferred zone for the first talkgroup call in response to said call setup request, a zone corresponding to the coverage area defined by the sites linked to the second zone controller; and broadcasting the preferred zone and the call setup request to cause the first communication unit to affiliate to the adjacent usable site linked to the second zone controller.

2. The method of claim 1, wherein said step of selecting a zone is determined on the basis of predetermined preferred zone assignments for each of said communication units.

3. The method of claim 1, wherein said step of selecting a zone is determined on the basis of current talkgroup characteristics.

4. The method of claim 3, wherein said talkgroup characteristics includes determining a current zone on the basis of current site affiliation information for affiliated communication units available to participate in the first talkgroup call.

5. In a trunked radio communication system including a first communication unit presently affiliated to a first usable site linked to a first zone controller, a method of reducing interzone activity by causing said first communication unit to affiliate to an adjacent usable site associated with an updated preferred zone while in a currently active talkgroup call involving a plurality of communication units located throughout a coverage area defined by sites linked to said first zone controller and at least a second zone controller, the method comprising the steps of:

monitoring talkgroup characteristics of members of the currently active talkgroup call;

selecting as an updated preferred zone, on the basis of said talkgroup characteristics, a zone corresponding to the coverage area defined by the sites linked to the second zone controller; and broadcasting the updated preferred zone to cause the first communication unit to affiliate to the adjacent usable site linked to the second zone controller.

6. The method of claim 5, wherein said step of monitoring talkgroup characteristics includes monitoring current talkgroup member site utilization.

7. The method of claim 5, wherein said step of monitoring talkgroup characteristics includes monitoring talkgroup member call loading patterns.

8. In a trunked radio communication system including a first communication unit presently affiliated to a first usable site linked to a first zone controller, a method of reducing interzone activity by forcing said first communication unit to affiliate to an adjacent usable site associated with a current preferred zone, prior to setup or while in a currently active talkgroup call involving a plurality of communication units located throughout a coverage area defined by sites linked to said first zone controller and at least a second zone controller, the method comprising the first communication unit performed steps of:

receiving and storing adjacent site information;

receiving a preferred zone identifier identifying as a current preferred zone a zone corresponding to the coverage area defined by the sites linked to the second zone controller, said current preferred zone having been selected on the basis of talkgroup characteristics;

evaluating the adjacent site information to identify any adjacent usable sites associated with the current preferred zone; and upon identifying an adjacent usable site associated with the current preferred zone, affiliating to the identified adjacent usable site.

9. The method of claim 8, wherein said talkgroup characteristics includes monitored current talkgroup member site utilization.

10. The method of claim 8, wherein said talkgroup characteristics includes monitored talkgroup member call loading patterns.

11. In a trunked radio communication system comprising a plurality of communication units including a first communication unit presently affiliated to a first talkgroup at a first usable site linked to a first zone controller, a method of reducing interzone activity by causing said first communication unit to affiliate to an adjacent usable site associated with a preferred zone, the method comprising the steps of:

identifying a talkgroup affiliation request for a second talk group involving said first communication unit;

selecting as a preferred zone for the first communication unit in response to said affiliation request, a zone corresponding to the coverage area defined by the sites linked to a second zone controller; and broadcasting the preferred zone to cause the first communication unit to affiliate to the adjacent usable site linked to the second zone controller.

12. The method of claim 11, wherein said step of selecting a zone is determined on the basis of predetermined preferred zone assignments for each of said plurality of communication units.

13. The method of claim 11, wherein said step of selecting a zone is determined on the basis of current talkgroup characteristics.

14. The method of claim 13, wherein said talkgroup characteristics includes determining a current zone on the basis of current site affiliation information for affiliated communication units available to participate in the first talkgroup call.

15. The method of claim 11, further comprising the steps of:

at one of the plurality of communication units presently belonging to a first talkgroup:

switching to a second talkgroup;

sending to the first zone controller, an identifier corresponding to the second talkgroup;

receiving, from the first zone controller, a preferred zone identifier associated with the second talkgroup to produce a received zone identifier; and evaluating site usability based on the received zone identifier.

16. The method of claim 11, further comprising the step of storing at one of the plurality of communication units, for at least two of a plurality of talkgroups among the plurality of communication units, the preferred zone for the at least two talkgroups to produce a preferred zone table.

17. The method of claim 16, further comprising the steps of:

at one of the plurality of communication units presently belonging to a first talkgroup and including a preferred zone table:

switching to a second talkgroup;

retrieving, from the preferred zone table, a preferred zone identifier associated with the second talkgroup to produce a received zone identifier; and evaluating site usability based on the received zone identifier.

18. In a trucked radio communication system including a first communication unit presently affiliated to a first talkgroup at a first usable site linked to a first zone controller, a method of reducing interzone activity by causing said first communication unit to affiliate to an adjacent usable site associated with an updated preferred zone, the method comprising the steps of:

monitoring talkgroup characteristics of members of the first talkgroup;

selecting as an updated preferred zone, on the basis of said talkgroup characteristics, a zone corresponding to the coverage area defined by the sites linked to the second zone controller; and broadcasting the updated preferred zone to cause the first communication unit to affiliate to the adjacent usable site linked to the second zone controller.

19. The method of claim 18, wherein said step of monitoring talkgroup characteristics includes monitoring current talkgroup member site utilization.

20. The method of claim 18, wherein said step of monitoring talkgroup characteristics includes monitoring talkgroup member call loading patterns.

\* \* \* \* \*